United States Patent Office 3,459,794
Patented Aug. 5, 1969

3,459,794
4-THIOL-2,3,5,6-TETRAFLUOROBENZOIC ACID
Christ Tamborski, Dayton, Ohio, assignor to the United States of America as represented by the Secretary of the Air Force
No Drawing. Filed Jan. 11, 1966, Ser. No. 520,317
Int. Cl. C07c *149/40, 149/34*
U.S. Cl. 260—516     1 Claim

ABSTRACT OF THE DISCLOSURE

Polymerizable compounds useful as lube additives having the structure

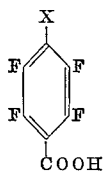

where X is a functional group selected from methyl, trifluoromethyl, carboxy, hydroxy, amino, thiol and 2,3,5,6-tetrafluorophenyl.

---

The invention described herein may be manufactured and used by or for the United States Government for governmental purposes without payment to me of any royalty thereon.

This invention relates to novel di-functional tetrafluoro aromatic compounds and to the method for the synthesis thereof.

In the advancing art of organic chemistry, particular attention has been focused upon fluorine-containing compounds because of their usefulness as fluid additives and particularly as additives to lubricants and greases and as high temperature materials when used by themselves or as additives to other compositions, particularly to a broad range of plastics and elastomers. In an effort to increase the numbers and types of compositions in which the fluorine is incorporated and in order to preserve its chemical retention by the compositions of which it is a part, the art has sought to form polymers containing the fluorine atom as an inherent part of the molecule. While a variety of polymers including some fluorine atoms are known, particularly in the fluoro aliphatic elastomer category, the availability of polymers containing tetrafluoroaryl units has been particularly limited. More specifically, the prior art has been unable to provide di-functional tetrafluoroaryl compositions with a variety of reatcive functional group substituents so that the availability of polymers based upon such structures has been seriously restricted and the advantageous uses to which such tetrafluoroaryl-containing compositions might be put have been extremely limited.

It is accordingly an object of this invention to provide as new compositions of matter, a family of di-functional tetrafluoro aromatic compounds.

Yet another object of the present invention is to provide di-functional tetrafluoro aromatic compounds containing a variety of reactive substituent functional groups.

Yet another object of the invention is to provide as a new composition of matter a di-functional mono-substituted tetrafluorobenzoic acid.

Still another object of the present invention is to provide a di-functional mono-substituted tetrafluorothiol.

Still another object of the invention is to provide methods for the synthesis of said novel compositions of matter.

The achievement of these and other objects and advantages of the present invention which will appear from a reading of the following disclosure is based upon the discovery that lithium-hydrogen interconversion can be extended to polyfluorinated aryl compounds having a hydrogen atom and a reactive functional group of the class which consists of methyl, trifluoromethyl, carboxy, hydroxy, amino, thiol and tetrafluorophenyl according to the following:

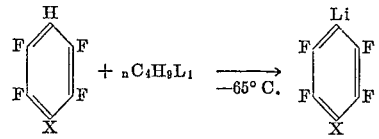

wherein X is a reactive group of that class which consists of $CH_3, CF_3, CO_2H, OH, NH_2, SH, HC_6F_4$ and H. A further discovery involved in the invention is that the subsequent reaction of the monolithium organometallic by carbonation thereof or by the addition of sulfur thereto to displace the lithium with a carboxy or thiol functional group does not interfere with the formation of the di-functional composition retaining in the para position to the carboxy or thiol group the original functional group that was present in the monolithio aryl organometallic as represented by the following equations:

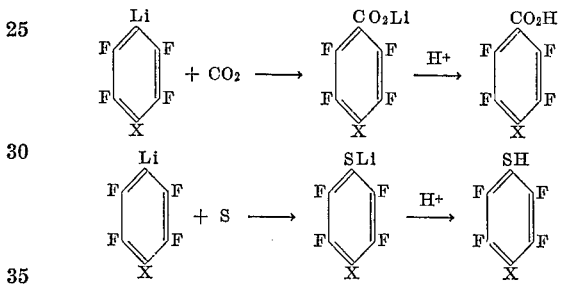

Where the substituent on the monohydrotetrafluorobenzene ring contains an acidic hydrogen atom as in the case of the hydroxy, amino, thiol and carboxy groups, the lithiating reaction must involve an equivalent amount of the n-butyllithium to form the lithium salt in addition to the n-butyllithium necessary to form the aryl lithium intermediate. By this general synthesis procedure, a wide variety of polyfluorinated aryl organolithium intermediates containing various substituents can be prepared and these may subsequently be reacted in carbonation reactions or by the addition of sulfur to provide a wide variety of tetrafluoro di-functional intermediates such as mono-substituted 2,3,5,6 tetrafluorobenzoic acids and mono-substituted 2,3,5,6 tetrafluorothiophenols. The resulting polyfluorinated phenyllithium compounds provide convenient synthesis procedures for the formation of polyfluoro monomers.

One specific example representing a di-functional mono-substituted tetrafluorocarboxylic acid with a hydroxy functional group in para position to the carboxy group is formed according to the following procedure.

One specific example representing a di-functional mono-substituted tetrafluorocarboxylic acid with a hydroxy functional group in para position to the carboxy group is 4-hydroxy-2,3,5,6-tetrafluorobenzoic acid which is formed as follows. A solution of 16.6 grams (0.1 mole) of 2,3,5,6-tetrafluorophenol dissolved in 50 milliliters of freshly distilled tetrahydrofuran is added dropwise to 140 milliliters of a (0.2 mole) n-butyllithium hexane solution in 400 milliliters of tetrahydrofuran which is pre-cooled to −70 degrees centigrade. This dropwise addition takes place over a 15 minute period, and 15 minutes after the addition is complete, Color Test IIA is negative. After an additional 35 minutes, carbon dioxide is bubbled into the reaction mixture. Forty-five minutes later, the cooling bath is removed and the reaction mixture warmed to room temperature with continued carbonation. The mixture is then hydrolyzed with 300 milliliters of 6 N HCl and is phase separated whereupon the organic layer is dried over sodium sulfate. The solvent is distilled under reduced pressure yielding 17.3 grams (82.5 percent) of the crude product. Recrystallization from xylene yields 4-hydroxy-2,3,5,6-tetrafluorobenzoic acid monohydrate with a melting point of from 154 to 156 degrees centigrade. Theoretical analysis of the compound is C, 36.85%; H, 1.76%; F, 33.31%. Analysis of the material indicates C, 37.05%; H, 1.80%; F, 33.13%.

An example of a di-functional mono-substituted tetrafluorothiophenol according to the present invention is 4-thiol-2,3,5,6-tetrafluorobenzoic acid prepared by the following procedure. A solution of 9.87 grams (0.051 mole) of 2,3,5,6-tetrafluorobenzoic acid in 30 milliliters of tetrahydrofuran is added dropwise to 65 milliliters of a (0.1 mole) n-butyllithium hexane solution precooled to −65 degrees centigrade in 200 milliliters of tetrahydrofuran over a 16 minute period. Forty-five minutes after the addition is complete, the Color Test IIA is negative. See H. Gilman and J. Swiss, J. Am. Chem. Soc., 62, 1847 (1940). After 23 additional minutes, 1.64 grams (0.051 mole) of sulfur is added to the reaction mixture causing the color gradually to change to a green and then to a deep yellow. The reaction mixture is stirred an additional 22 hours after which Color Test I is negative. The mixture is then allowed to warm to room temperature and hydrolyzed with 150 milliliters of 6 N hydrochloric acid and is phase separated whereupon the organic layer is dried over magnesium sulfate. The solvent is removed by distillation and the crude material remaining is recrystallized from petroleum ether (with a boiling point of from 90 to 120 degrees centigrade) to yield 7.50 grams (68.7 percent) of yellow crystalline 4-thiol-2,3,5,6-tetrafluorobenzoic acid with a melting point of from 155 to 157 degrees centigrade. Theoretical analysis of the compound is C, 37.18%; H, 0.89%; F, 33.60%; S, 14.18%. Analysis of the material indicates C, 37.25%; H, 0.95%; F, 32.75%; S, 14.25%.

While the within invention has been described in considerable detail in connection with certain specific embodiments and examples thereof, it is to be understood that the foregoing description has been for the purposes of illustration only and does not limit the scope of the invention as it is defined in the subjoined claim.

I claim:
1.

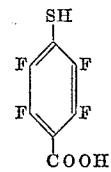

References Cited

Alsop et al.: Journal of Chemical Society, 1962, pp. 1801–5.

Gilman et al.: Journal of American Chemical Society, vol. 71, pp. 1478–81 (1949).

Hudlicky: "Chemistry of Organic Fluorine Compounds," p. 224, The MacMillan Co., New York, 1961.

LORRAINE A. WEINBERGER, Primary Examiner

M. G. BERGER, Assistant Examiner

U.S. Cl. X.R.

260—515, 518, 521, 578, 609, 623, 649, 650